US011226789B2

(12) United States Patent
Sievers

(10) Patent No.: US 11,226,789 B2
(45) Date of Patent: Jan. 18, 2022

(54) METHOD FOR DETERMINING A VALUE OF AN INTEGER SCALING IN A LINKING OF INPUT SETS TO OUTPUT SETS, AND COMPUTER PROGRAM PRODUCT

(71) Applicant: VOLKSWAGEN AKTIENGESELLSCHAFT, Wolfsburg (DE)

(72) Inventor: Oliver Sievers, Gifhorn (DE)

(73) Assignee: VOLKSWAGEN AKIIHNGESELLSCHAFT, Wolfsburg (DE)

( * ) Notice: Subject to any disclaimer, the term of this patent is extended or adjusted under 35 U.S.C. 154(b) by 147 days.

(21) Appl. No.: 16/495,488

(22) PCT Filed: Mar. 9, 2018

(86) PCT No.: PCT/EP2018/055860
§ 371 (c)(1),
(2) Date: Sep. 19, 2019

(87) PCT Pub. No.: WO2018/172100
PCT Pub. Date: Sep. 27, 2018

(65) Prior Publication Data
US 2020/0026495 A1 Jan. 23, 2020

(51) Int. Cl.
*G06F 7/483* (2006.01)
*G06F 7/535* (2006.01)
*G06F 7/499* (2006.01)

(52) U.S. Cl.
CPC .......... *G06F 7/49942* (2013.01); *G06F 7/483* (2013.01); *G06F 7/535* (2013.01); *G06F 7/49936* (2013.01)

(58) Field of Classification Search
CPC .................. G06F 7/49936; G06F 7/49942
See application file for complete search history.

(56) References Cited

U.S. PATENT DOCUMENTS 6,591,361 B1 * 7/2003 Liao ................. G06F 9/3001
708/208
9,436,442 B1 9/2016 Kintali et al.
(Continued)

FOREIGN PATENT DOCUMENTS

DE      100 56 047 C1    4/2002

OTHER PUBLICATIONS

International Search Report of PCT Application No. PCT/EP2018/055860, dated May 28, 2018.
(Continued)

*Primary Examiner* — Chuong D Ngo
(74) *Attorney, Agent, or Firm* — Pearl Cohen Zedek Latzer Baratz LLP

(57) ABSTRACT

The invention relates to a method for determining a value of an integer scaling in a linking of input sets to output sets, wherein the linking comprises operators, each of which has operator inputs and operator outputs that are at least partially linked to one another or to the input sets or to the output sets, by using a computer device having a processing unit, a memory unit, and an output unit. Representations of set objects are used to efficiently carry out rescaling operations within the linking, with up to infinitely large resolution sets. This procedure makes it possible to calculate resource-conserving integer scalings for a target system while taking secondary conditions into account.

10 Claims, 2 Drawing Sheets

(56) References Cited

U.S. PATENT DOCUMENTS

| | | | |
|---|---|---|---|
| 2005/0280615 A1* | 12/2005 | Cok | G09G 3/3216 |
| | | | 345/77 |
| 2016/0080751 A1* | 3/2016 | Xiu | H04N 19/60 |
| | | | 375/240.02 |
| 2018/0278946 A1* | 9/2018 | Said | H04N 19/192 |

OTHER PUBLICATIONS

Menard, Daniel et al. "Floating-to-Fixed-Point Conversion for Digital Signal Processors", EURASIP Journal of Applied Signal Processing, vol. 2806, p. 1-19, Jan. 1, 2006.

Cilio, Andrea G. M. et al. "Floating Point to Fixed Point Conversion of C Code", $8^{TH}$ International Conference on Compiler Construction (CC '99), Amsterdam, The Netherlands, p. 229-243, Mar. 22-28, 1999.

Sarkar, Mihir. "A Floating-Point to Fixed-Point Conversion Methodology for Audio Algorithms", Jan. 1, 2004.

* cited by examiner

METHOD FOR DETERMINING A VALUE OF AN INTEGER SCALING IN A LINKING OF INPUT SETS TO OUTPUT SETS, AND COMPUTER PROGRAM PRODUCT

CROSS-REFERENCE TO RELATED APPLICATIONS

This application is a National Phase Application of PCT International Application No. PCT/EP2018/055860, International Filing Date Mar. 9, 2018, claiming priority of German Patent Application No. 10 2017 204 946.4, filed Mar. 23, 2017, which is hereby incorporated by reference.

FIELD OF THE INVENTION

The invention relates to a method for determining a value of an integer scaling in a linking of input sets to output sets. The invention further relates to a computer program product.

BACKGROUND OF THE INVENTION

For resource-related reasons, fixed-point implementations are used instead of floating-point implementations for real-time calculations, for example for physical calculations that are to be carried out in control and/or regulation systems. One particularly important application relates to the computer programs or software in control devices for drives of motor vehicles.

The conversion of floating-point implementations into fixed-point implementations for code generation presently generally requires a high time expenditure for implementation and testing. Programming tools usually provide little assistance in this process. A procedure that uses manual calculations and frequent trials involves the risk of an insufficiently systematic approach and susceptibility to errors, with the unpleasant consequence that errors are possibly not discovered until later, during the development process.

Known programming tools allow a semiautomatic fixed-point implementation (integer scaling) based on recorded or simulated signal patterns. The Fixed-Point Advisor program from MathWorks, Inc., Natick, Mass., US, is such a programming tool. The document U.S. Pat. No. 9,436,442 B1 describes methods and systems that enable a programmer to convert a model of a dynamic system with floating-point implementation, based on a higher-level programming language, into a code with fixed-point implementation that can be executed on a processor or a logic gate. In the cited document, the application of the dynamic system is simulated, so that simulated value ranges for floating-point variables are obtained, and the dynamic system is statically analyzed to obtain static value ranges for floating-point variables. Based on these value ranges, types of fixed-point variables are determined in an automated manner and used in the generation of a code.

In practice, use of the application has shown that quite large data volumes that are determined by measurement or are simulated must be available with suitable quality; however, generating these data, presuming adequate signal coverage (which is usually difficult to determine) may involve a high level of effort. In the event of revisions, it may be necessary to generate the data volumes anew, and peripheral areas may possibly not be captured. The quality of the solution is highly dependent on the quality of the data.

The document DE 100 56 047 C1 relates to a method and a computer device for converting an arithmetic expression of floating-point arithmetic into fixed-point arithmetic. According to the cited document, normalization factors are determined for the variables of the floating-point expression. In order to generate a fixed-point expression that has preferably compact program code and a short run time, the normalization factors are summarized to form constants by multiplication and/or division, so that the number of constants is minimal. The number of operations to be processed for executing the fixed-point expression is reduced by means of optimization algorithms.

In practice, it has been shown that inaccuracies in the physical representation may occur, since the integer scalings that are carried out are not based on physical representations. The underlying method concentrates on local phenomena, so that significant manual follow-up work must be performed as soon as the overall model is considered. The resolutions are preset at defined locations by the user of the programming tool, so that there is a risk of encountering settings at various locations that are incompatible with one another. Eliminating these application errors may require laborious review of the code and an iterative procedure. The quality of the solution therefore varies significantly, depending on the expert knowledge of the programmer.

To eliminate the stated disadvantages, manual review of the generated code is generally performed in order to identify indicators for physical deviations or a high expenditure of resources. The programmers make do with an iterative procedure based on expert knowledge and best practice examples in order to eliminate possible problems in the future or to speed up the execution of the generated code. The quality of the physical representation of the integer-scaled model remains to be tested.

It is therefore desirable to be able to make a determination of an integer scaling, also referred to as a resolution, in a model, referred to below as linking, based on the complete and/or overall physical requirements in one method pass, while avoiding or mitigating at least one of the described disadvantages.

SUMMARY OF THE INVENTION

The object of the present invention is to carry out an integer scaling for a linking based on the physical requirements, without the need for resorting to data that are simulated or determined by measurement.

This object is achieved according to the invention by a method for determining a value of an integer scaling in a linking of input sets and output sets, having the features according to the independent claims. Advantageous refinements of the invention are characterized in the dependent claims. The features individually set forth in the patent claims may be combined with one another in a technologically meaningful manner, and may be supplemented by the explanatory material from the description and/or details from the figures, which indicate further embodiment variants of the invention.

In the method according to the invention, (at least) one value of an integer scaling, also referred to as a resolution, (at a location) in a linking, also referred to as a model, of input sets to output sets is determined. The linking comprises operators, each of which has operator inputs and operator outputs that are at least partially linked to one another or to the input sets or to the output sets.

According to the invention, a computer device having a processing unit, a memory unit, and an output unit is utilized. In each case a representation of the effect of each of the operators on the particular integer scaling of its operator inputs is provided, in particular in the memory unit, for generating the particular integer scaling of its operator outputs. In the method according to the invention, for each input set, each operator input, each operator output, and each output set, an initial representation of the set of all allowed integer scalings and a representation of a rescaling of an integer scaling to a set of all integer scalings, which are achievable by allowable transformations, are stored in each case in the memory unit. The initial representations of the input sets are propagated forward through the linking, so that for each operator input, for each operator output, and for each output set, a representation of the set of all possible integer scalings is generated in the processing unit. According to the connections in the linking, and consistent with the initial representations (for each operator output, each operator input, and each output set), for each translation of an input set to an operator input, the representation of the rescaling (to the representation of the input set) is applied, for each translation of an operator output to an operator input or to an output set, the representation of the rescaling (to the representation of the operator output) is applied, and for each operator, the representation of its effect is applied. One element from one of the generated sets is specified as the value of the integer scaling, based on a selection that is made in an automated manner in the processing unit, and (at least) the specified value is output in the output unit.

Stated summarily in a straightforward manner, in the method according to the invention complete sets of scalings that are possible at locations in the linking are processed in parallel and reduced to a subset thereof, or more precisely, to a selection of mutually consistent scalings at the locations, in a particularly advantageous manner. For this purpose, representations of abstract or abstracted set objects are used in the method according to the invention. In other words, the method according to the invention allows a complete, requirements-based, efficient determination of all relevant resolutions and rescaling variants in any given combination. Due to the underlying overall consideration of the linking, the method provides a high-quality result.

The method according to the invention allows a fixed-point scaling based on the physical requirements, without the need for finding data that are determined by simulation or measurement. In the procedure according to the invention, it is particularly advantageous that as a whole, instead of determining the solution based on only one location, in particular optimization is achieved. As a result, the method is particularly efficient. The method implements requirements with which the characteristics of the calculated resolutions, the physical representational accuracy of the generated integer model, the quantity of available bit space, and/or the balance between an implementation on the target system that favors memory and an implementation that favors run time, may be controlled. In addition, the method allows the integer scaling of portions of the linking in the context of an environment that is modifiable only in portions.

Input sets, operator inputs and operator outputs, and output sets form locations (pins) in the linking. The input sets and the output sets are in each case integer-scaled and/or represented as sets for fixed-point arithmetic.

An allowed integer scaling for a location is an integer scaling that lies within an enveloping interval for integer scalings at this location and/or is fixed or limited as a criterion of the integer scaling. In this way, resolution limits, which may optionally be calculated or set in advance, are advantageously taken into account in order to include, for example, minimum bit widths and/or minimum accuracies in the integer scaling.

In the context of the invention, the input sets may also be exactly one input set. In the context of the invention, the output sets may also be exactly one output set. In the context of the invention, the operators may also be exactly one operator. An operator may have exactly one operator input and/or exactly one operator output. In other words, the plurality used in the context of the invention for the definition and the description also includes the singularity of the particular features.

For those skilled in the art, it is immediately and unambiguously clear that the linking is or may be inverted. This means that the sets designated as input sets may also be output sets, and the sets designated as output sets may also be input sets, in which case the portions designated as operators each represent respective inverse operators in the linking. In other words, of the two directions in the linking, for those skilled in the art, which direction is the forward direction and which is the backward direction depends on the particular specific relationship. A linking, in particular in an application, may also always be used in the backward direction, or may be intended for use in the backward direction.

In the method according to the invention, in one preferred embodiment the forward propagation comprises each representation obtained in one of the translations at an operator input being intersected with the (initial or instantaneous) representation at this operator input, each representation obtained by operator application at an operator output being intersected with the (initial or instantaneous) representation at this operator output, and each representation obtained for an output set being intersected with the (initial or instantaneous) representation of this output set. An instantaneous representation is the representation obtained from a preceding propagation step.

In practice, it has been found that in the method according to the invention, representations that are based on prime factor sets having a finite number or an infinite number of prime factor combinations may be used in a particularly advantageous manner. In particular, the representations are composed of union sets of sets of quotients from elements of prime factor sets.

Furthermore, in advantageous embodiments of the method according to the invention, after the forward propagation and prior to the determination of an element, the generated representations of the output sets are propagated backward through the linking, so that for each operator input, for each operator output, and for each input set, a representation of the set of all possible integer scalings is generated in the processing unit. According to the connections in the linking, and consistent with the representations obtained in the forward propagation, for each translation of an output set to an operator output, the representation of the inverse rescaling is applied, and for each translation of an operator input to an operator output or to an input set, the representation of the inverse rescaling is applied, and for each operator, the representation of its inverse effect is applied. In particular, the representations generated by forward propagation may be compared to the representations generated by backward propagation, and a further forward propagation is carried out if a backward propagation most recently took place, or a further backward propagation is carried out if a forward propagation most recently took place, until the representations generated by the most recent forward propagation no longer differ from the representations generated by the most recent backward propagation. Stability of the obtained solution is thus achieved in an advantageous manner.

In one advantageous refinement, the method according to the invention may be iterated for determining a value of an integer scaling at another location in the linking: As an alternative or in addition to the described steps, in embodiments of the method according to the invention, after the element is determined from the one generated set, the generated representation of the set may be projected onto the representation of the element. Then, based on the other generated representations and the representation of the element, at least one, in particular one or more, new propagation(s), in particular a forward propagation and/or a backward propagation, may be carried out. Lastly, a further element from one of the other sets that is generated after, in particular immediately after, this new propagation, in particular forward propagation and/or backward propagation, may be fixed as the value of the integer scaling at another location in the linking, based on a selection that is made in an automated manner in the processing unit, and (at least) the fixed further value is output in the output unit.

The setting may be made after exactly one of the stated forward propagations, or after one or more further forward propagations and/or backward propagations. In particular, it is preferred that stability is or has once again been achieved.

In one alternative or additional refinement of embodiments of the method according to the invention, the selection that is made in an automated manner in the processing unit may comprise the elements of the generated set of the integer scalings being assessed with a cost function, and the element to be selected being determined based on its associated costs. The cost function is preferably based on the processing time for computing operations for rescaling steps. In this way, a particularly preferred element, for example one that has a short computing time during a rescaling, or a certain resolution or integer scaling may be selected for a subsequent implementation of the linking in an application.

Additionally or alternatively, embodiments of the method according to the invention may be supplemented by selecting allowable transformations from a set of possible transformations, in particular in an automated manner, before the representation of the rescaling of an integer scaling is created or selected for the set of all integer scalings, and then storing them in the memory.

A computer program product is also part of the inventive concept.

The computer program product according to the invention may be loaded directly into the internal memory of a computer, and includes software code sections with which a method having features or feature combinations according to the present description is carried out when the computer program product runs on the computer. In specific embodiments, the computer program product according to the invention may be disseminated in particular on a data medium, for example a CD, a DVD, or a memory stick, or by transmission starting from a computer. In other specific embodiments, the computer program product according to the invention, starting from a local computer that is linked to a remote computer, may be executed on the remote computer.

BRIEF DESCRIPTION OF THE DRAWINGS

Further advantages and advantageous embodiments and refinements of the invention are set forth based on the following description, with reference to the figures, which show the following.

DETAILED DESCRIPTION OF THE INVENTION

Figure 1:
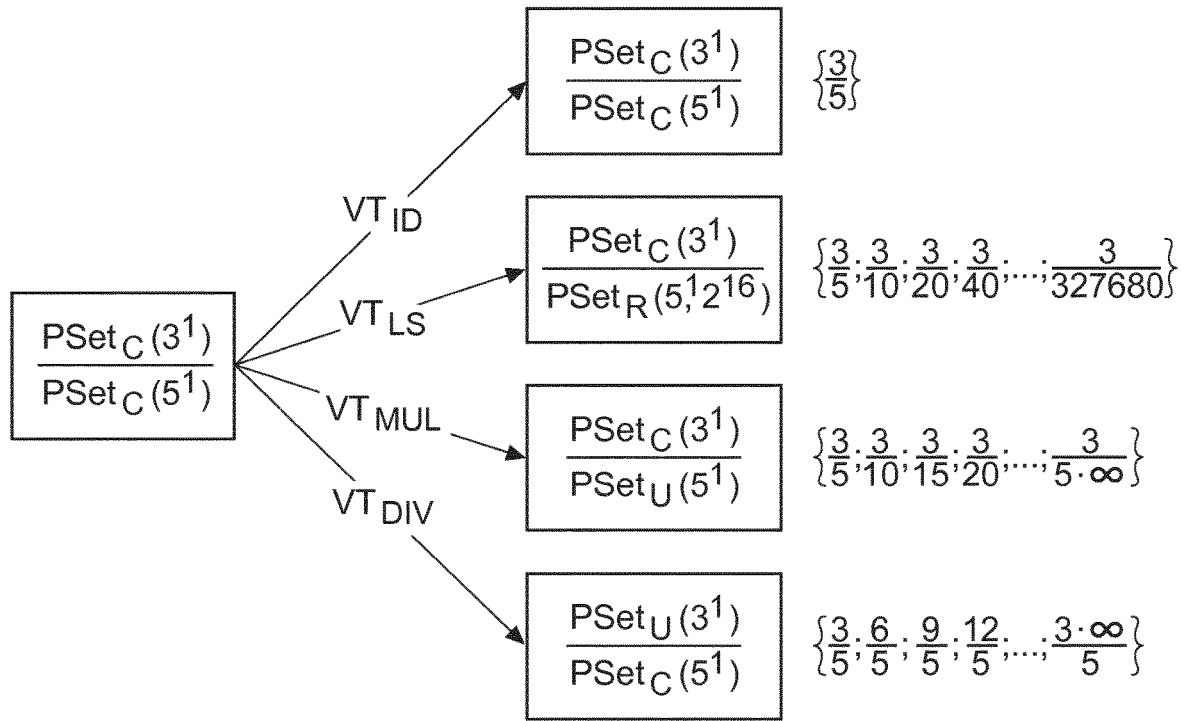
FIG. 1 shows an example of forward transformation of a QSet object.

Before describing one particularly advantageous embodiment of the method according to the invention, with reference to the figures and with the aid of one specific linking example, in order to form the basis, domain-specific set objects are first described whose representations are used according to the invention in the scaling method.

Firstly, the abstract set objects that are directed to the "integer scaling" problem domain, which form the framework of the scaling method, are defined.

A prime factor set object (hereinafter PSet object) maps a set of possible prime factor combinations. A distinction is made between three variants of these set objects. The variants together with their parameters form an abstraction of prime factorizations. A PSet object, depending on its variant, represents either a finite number or an infinite number of prime factor combinations.

The set $PSet_C$ is a finite set that has one element, and that describes a specific prime factor combination and forms a first variant. It is defined by $$PSet_C(\beta) = PSet_C(a_1 \ldots a_n, e_1 \ldots e_n) := \left\{ x \in \mathbb{N} \mid x = \prod_{i=1}^{n} a_i^{e_i} \right\} := \{\beta\}$$

with the prime numbers $a_i \in \mathbb{P}$ and the exponents $e_i \in \mathbb{N}_0$. The $PSet_C$ object describes a finite set having one element, the value of this element being base $\beta = \Pi_{i=1}^{n} a_i^{e_i}$ with $\beta \in \mathbb{N}$. Since each natural number has a unique prime factorization, the value $\beta \in \mathbb{N}$ is sufficient to completely describe the $PSet_C$ object.

Examples of $PSet_C$ sets are presented in the following table:

| $PSet_C$ | Set elements |
|---|---|
| $PSet_{C0}(3^1 \cdot 5^1 \cdot 13^1) = PSet_{C0}(195)$ | $\{3^1 \cdot 5^1 \cdot 13^1\}$ |
| $PSet_{C1}(3^1 \cdot 5^3) = PSet_{C0}(375)$ | $\{3^1 \cdot 5^3\}$ |
| $PSet_{C2}(7^2 \cdot 11^1) = PSet_{C0}(539)$ | $\{7^2 \cdot 11^1\}$ |

A fixed prime factor base combination $\beta$ is likewise defined for the object $PSet_R$. The elements of the $PSet_R$ set are formed in each case by taking different factors from an extended set $\Psi$ and multiplying by the base $\beta$, resulting in $$PSet_R(\beta, \Psi) = PSet_R(a_1 \ldots a_n, e_1 \ldots e_n, b_1 \ldots b_m, k_{1,max} \ldots k_{m,max})$$

$$:= \left\{ x \in \mathbb{N} \mid x = \prod_{i=1}^{n} a_i^{e_i} \cdot \prod_{j=1}^{m} b_j^{k_j} \wedge k_j \leq k_{j,max} \right\}$$

$$:= \{ x \in \mathbb{N} \mid x = \beta \cdot \psi \wedge \psi \in \Psi \}$$

with $a_i, b_j \in \mathbb{P}$ and $e_i, k_j \in \mathbb{N}_0$, and for the base $\beta$ and the extended set $\Psi$, $$\Psi(b_1 \ldots b_m, k_{1,max} \ldots k_{m,max}) := \left\{ x \in \mathbb{N} \mid x = \prod_{j=1}^{m} b_j^{k_j} \wedge k_j \leq k_{j,max} \right\}.$$

The extended set $\Psi$ may be completely described by its maximum value $$\tilde{\Psi} = \prod_{j=1}^{m} b_j^{k_{j,max}}, \tilde{\Psi} \in \mathbb{N}$$

since the prime factor bases $b_j \in \mathbb{P}$ as well as the exponents $k_{j,max} \in \mathbb{N}_0$ may be unambiguously determined by prime factorizaton. Thus, the following applies: $PSet_R = f(\beta, \Psi(\tilde{\Psi})) = f(\beta, \tilde{\Psi})$.

These sets form a second variant with a restrictively expandable base value.

Examples of $PSet_R$ sets are presented in the following table:

| $PSet_R$ | Set elements |
|---|---|
| $PSet_{R0}(3^1 \cdot 5^1, 13^2) = PSet_{R0}(15, 169)$ | $\{3^1 \cdot 5^1 \cdot 13^0,$ $3^1 \cdot 5^1 \cdot 13^1,$ $3^1 \cdot 5^1 \cdot 13^2\}$ |
| $PSet_{R1}(3^1 \cdot 5^1, 2^1 \cdot 3^1) = PSet_{R1}(15, 6)$ | $\{3^1 \cdot 5^1 \cdot 2^0 \cdot 3^0,$ $3^1 \cdot 5^1 \cdot 2^0 \cdot 3^1,$ $3^1 \cdot 5^1 \cdot 2^1 \cdot 3^0,$ $3^1 \cdot 5^1 \cdot 2^1 \cdot 3^1\}$ |
| $PSet_{R2}(1^1, 7^2 \cdot 11^1) = PSet_{R2}(1, 539)$ | $\{7^0 \cdot 11^0,$ $7^0 \cdot 11^1,$ $7^1 \cdot 11^0,$ $7^1 \cdot 11^1,$ $7^2 \cdot 11^0,$ $7^2 \cdot 11^1\}$ |

The $PSet_U$ sets are a third variant having a base element with unlimited expandability. A fixed base component $\beta \in \mathbb{N}$ is again used for the $PSet_U$ set. The elements of the set result from expanding the base component by an arbitrary number of prime factors.

The $PSet_U$ set is defined as $$PSet_U(\beta) = PSet_U(a_1 \ldots a_n, e_1 \ldots e_n)$$

$$:= \left\{ x \in \mathbb{N} \mid x = \prod_{i=1}^{n} a_i^{e_i} \cdot \prod_{j=1}^{m} b_j^{k_j} \wedge b_j \in \mathbb{P} \wedge k_j \in \mathbb{N}_0 \right\}$$

$$:= \left\{ x \in \mathbb{N} \mid x = \beta \cdot \chi \wedge \beta = \prod_{i=1}^{n} a_i^{e_i} \wedge \chi \in X \right\}$$

with the constant base $\beta \in \mathbb{N}$, the prime factors $\alpha_i \in \mathbb{P}$, the positive exponents $e_i \in \mathbb{N}_0$, and the infinitely large overall factor set X, $$X := \left\{ x \in \mathbb{N} \mid x = \prod_{j=1}^{m} b_j^{k_j} \wedge b_j \in \mathbb{P} \wedge k_j \in \mathbb{N}_0 \right\}.$$

The overall factor set X maps all existing combinations of prime factors having positive exponents. It is not specific for the particular $PSet_U$ object, and therefore is not a parameter.

Examples of $PSet_U$ sets are illustrated in the following table:

| $PSet_U$ | Set elements |
|---|---|
| $PSet_{U0}(1^1) = PSet_{U0}(1)$ | $\{1^1, 2^1, 3^1, 2^2, 5^1, 2^2 \cdot 3^1, 7^1, \ldots\}$ |
| $PSet_{U1}(3^1) = PSet_{U1}(3)$ | $\{3^1, 2^1 \cdot 3^1, 3^2, 2^2 \cdot 3^1, 3^1 \cdot 5^1, \ldots\}$ |
| $PSet_{U2}(3^1 \cdot 5^1) = PSet_{U2}(15)$ | $\{3^1 \cdot 5^1, 2^1 \cdot 3^1 \cdot 5^1, 3^2 \cdot 5^1, 2^2 \cdot 3^1 \cdot 5^1, \ldots\}$ |

The described variants of a PSet object, together with the variant-based parameters, form an abstraction of prime factor combinations having positive exponents. Each PSet set may be completely characterized via its variant and the associated parameters in the form of natural numbers ($\beta$, $\tilde{\Psi}$ in the case of $PSet_R$, and $\beta$ in the case of $PSet_C$, $PSet_U$).

Various operations, in particular intersection and multiplication operations, are possible on the PSet sets. Each of these operations gives a result of either exactly one PSet set object or an empty set. The operations in question are defined below. They form the basis for subsequently generating abstract resolution sets from PSet objects.

An operation $PSet_{0\cdot 1} = PSet_0 \cdot PSet_1$ which calculates the product of any two given PSet set objects is defined as a PSet product. The result set contains the products of each element of the set $PSet_0$ and each element of the set $PSet_1$. The definitions of the PSet product for the various variants are provided in the following table:

| Result matrix product | $PSet_{C1}$ | $PSet_{R1}$ | $PSet_{U1}$ |
|---|---|---|---|
| $PSet_{C0}$ | $PSet_C(\beta_0 \cdot \beta_1)$ | $PSet_R(\beta_0 \cdot \beta_1, \tilde{\Psi}_1)$ | $PSet_U(\beta_0 \cdot \beta_1)$ |
| $PSet_{R0}$ | $PSet_R(\beta_0 \cdot \beta_1, \tilde{\Psi}_0)$ | $PSet_R(\beta_0 \cdot \beta_1, \tilde{\Psi}_0 \cdot \tilde{\Psi}_1)$ | $PSet_U(\beta_0 \cdot \beta_1)$ |
| $PSet_{U0}$ | $PSet_U(\beta_0 \cdot \beta_1)$ | $PSet_U(\beta_0 \cdot \beta_1)$ | $PSet_U(\beta_0 \cdot \beta_1)$ |

An operation $PSet_{0 \cap 1} = PSet_0 \cap PSet_1$ that forms the intersecting set of any two given PSet set objects is defined as a PSet intersecting set. The result of the operation is either a PSet object or an empty set $\{\ \}$. The definitions of the PSet intersecting set for the various variants are provided in the following table:

| Result matrix intersection | $PSet_{C1}$ |
|---|---|
| $PSet_{C0}$ | $\begin{cases} PSet_C(\beta_0), & \beta_0 = \beta_1 \\ \{\}, & otherwis \end{cases}$ |
| $PSet_{R0}$ | $\begin{cases} PSet_C(\beta_1), & [\beta_0 \subseteq \beta_1] \wedge [\beta_1 \subseteq (\beta_0 \cdot \tilde{\Psi}_0)] \\ \{\}, & otherwis \end{cases}$ |
| $PSet_{U0}$ | $\begin{cases} PSet_C(\beta_1), & \beta_0 \subseteq \beta_1 \\ \{\}, & otherwis \end{cases}$ |

| Result matrix intersection | $PSet_{R1}$ |
|---|---|
| $PSet_{C0}$ | $\begin{cases} PSet_C(\beta_0), & [\beta_1 \subseteq \beta_0] \wedge [\beta_0 \subseteq (\beta_1 \cdot \tilde{\Psi}_1)] \\ \{\}, & otherwis \end{cases}$ |
| $PSet_{R0}$ | $\begin{cases} PSet_R\left(\beta_0 \cup \beta_1, \dfrac{\alpha}{\beta_0 \cup \beta_1}\right), & [\beta_0 \subseteq \alpha] \wedge [\beta_1 \subseteq \alpha] \\ \{\}, & otherwis \end{cases}$ |

-continued

| Result matrix intersection | $PSet_{C1}$ |
|---|---|
| $PSet_{U0}$ | $\begin{cases} PSet_R\left(\beta_0 \overset{\smile}{\cup} \beta_1, \dfrac{\alpha}{\beta_0 \overset{\smile}{\cup} \beta_1}\right), & \beta_0 \overset{\sim}{\subseteq} \alpha \\ \{\}, & \text{otherwis} \end{cases}$ where $\alpha := (\beta_0 \cdot \check{\Psi}_0) \overset{\frown}{\cap} (\beta_1 \cdot \check{\Psi}_1)$ |
| Result matrix intersection | $PSet_{U1}$ where $\alpha := \beta_1 \cdot \check{\Psi}_1$ |
| $PSet_{C0}$ | $\begin{cases} PSet_C(\beta_0), & \beta_1 \overset{\sim}{\subseteq} \beta_0 \\ \{\}, & \text{otherwis} \end{cases}$ |
| $PSet_{R0}$ | $\begin{cases} PSet_R\left(\beta_0 \overset{\smile}{\cup} \beta_1, \dfrac{\alpha}{\beta_0 \overset{\smile}{\cup} \beta_1}\right), & \beta_1 \overset{\sim}{\subseteq} \alpha \\ \{\}, & \text{otherwis} \end{cases}$ |
| $PSet_{U0}$ | $PSet_U(\beta_0 \overset{\smile}{\cup} \beta_1)$ where $\alpha := \beta_0 \cdot \check{\Psi}_0$ |

The operators $\overset{\smile}{\cup}$, $\overset{\frown}{\cap}$, and $\overset{\sim}{\subseteq}$ are operations on the prime factorizations of natural numbers. The basis of the definitions are the prime factor combinations of the numbers $x_0$ and $x_1$:

$$x_0 = \prod_{i=1}^{n} a_i^{e_i}, \quad x_1 = \prod_{j=1}^{m} b_j^{f_j}$$

with the prime numbers $a_i, b_j \in \mathbb{P}$ and the exponents $e_i, f_j \in \mathbb{N}_0$.

The result value of an intersecting set on the prime factor level ($x_0 \overset{\smile}{\cup} x_1$) contains all mutual prime factor bases, in each case with the minimum exponents. The result value of a union set on the prime factor level ($x_0 \overset{\frown}{\cap} x_1$) contains all prime factor bases of $x_0$ and $x_1$ with the maximum exponents in each case. For a subset on the prime factor level ($x_0 \overset{\sim}{\subseteq} x_1$), a set $x_0$ is a subset of $x_1$ when $x_1$ contains at least all prime factor bases of the set $x_0$ and has exponents with an absolute value at least as high.

A resolution set object QSet, QSet object, is a set object that describes a set of rational resolutions by one PSet object each for the numerator $PSet_{nom}$ and the denominator $PSet_{den}$, optionally in an enveloping interval $Q_{Limit}$ with interval limits $Q_{min}$ and $Q_{max}$. This means that a QSet resolution set thus contains the following information: numerator set object $PSet_{nom}$, denominator set object $PSet_{den}$, and optionally an enveloping interval $Q_{Limit} = [Q_{min}, Q_{max}]$, where $Q_{min}, Q_{max} \in \mathbb{Q}^+$:

$$QSet(PSet_{nom}, PSet_{den}, Q_{Limits}) :=$$
$$\left\{ x \in \mathbb{Q}^+ \mid x = \frac{x_0}{x_1} \wedge x_0 \in PSet_{nom} \wedge x_1 \in PSet_{den} \wedge Q_{min} \leq x \leq Q_{max} \right\}$$

The elements of the QSet set result from dividing each element of the numerator set by any other given element of the denominator set, provided that the result lies within the optionally specified enveloping interval. Examples of abstract resolution sets (simplified presentation in rational form, and in the present case, without an enveloping interval) are provided in the following table:

| QSet | Set elements |
|---|---|
| $QSet_1 = \dfrac{PSet_C(5^1)}{PSet_C(2^1)}$ | $\{2^{-1} \cdot 5^1\}$ |
| $QSet_2 = \dfrac{PSet_R(5^1, 2^2)}{PSet_C(1^1)}$ | $\{5^1, 5^1 \cdot 2^1, 5^1 \cdot 2^2\}$ |
| $QSet_3 = \dfrac{PSet_R(5^1, 2^2)}{PSet_R(3^1, 2^1)}$ | $\{2^{-1} \cdot 3^{-1} \cdot 5^1, 2^6 \cdot 3^{-1} \cdot 5^1, 2^1 \cdot 3^{-1} \cdot 5^1, 2^2 \cdot 3^{-1} \cdot 5^1\}$ |
| $QSet_4 = \dfrac{PSet_U(5^1)}{PSet_C(1^1)}$ | $\{5^1, 2^1 \cdot 5^1, 3^1 \cdot 5^1, 2^2 \cdot 5^1, 5^2, 2^1 \cdot 3^1 \cdot 5^1, \ldots\}$ |

Operations on QSet objects are carried out based on the "product" and "intersecting set" operations defined for PSet objects. The QSet inversion operation $\overline{QSet}$ brings about the inversion of all elements (resolutions) of the input set. The numerator $PSet_{nom}$ and the denominator $PSet_{den}$ of the set to be inverted are exchanged to form the result. The rational limits of the enveloping interval $Q_{Limit}$ are inverted by reversal. The operation QSet product $QSet_1 \cdot QSet_2$ gives a result QSet object, which in its set representation contains all products of element combinations of the set $QSet_1$ with those of the set $QSet_2$. The numerator PSet objects of the operands $Q_{Set,1}$ and $Q_{Set,2}$ are multiplied by the PSet product operation in order to calculate the numerator object of the result. An analogous procedure is followed for the denominator PSet objects. A corresponding multiplication based on interval arithmetic is carried out for the enveloping interval. The operation division $QSet_1 / QSet_2$ maps the division of all elements (resolutions) of $QSet_1$ with those of the set $QSet_2$. The division is carried out using the inversion and product operations:

$$\frac{QSet_1}{QSet_2} := QSet_1 \cdot \overline{QSet_2}$$

The enveloping interval is divided using interval arithmetic.

The intersecting set operation $QSet_1 \cap QSet_2$ calculates the intersecting set of two input sets. The result object is calculated from the intersecting set of the two numerator PSet objects for determining the result numerator, and of the two denominator PSet objects for determining the result denominator. The enveloping interval of the result is obtained from the intersection of the input enveloping intervals. If the resulting numerator or denominator term represents an empty set, the intersection result is likewise an empty set. The prerequisite for correct results is a preceding normalization of the numerator and denominator PSet objects, in which mutually shortenable components of the bases $\beta$ are determined, and are in each case converted into a variable component for both objects. A result set is an empty set when it contains no element in the enveloping interval $Q_{Limit}$.

In an integer-scaled model, adaptations of signal resolutions are necessary at certain points in order to satisfy the mathematical relationships of fixed-point arithmetic and to conform to maximum bit widths of the target platform. This procedure is referred to as rescaling. With reference to the set algebra described herein, transformations of QSet objects are to be carried out.

It is assumed that within the scope of the integer scaling of a linking, each integer signal S has an associated resolution $q_s \in \mathbb{Q}^+$, and the physical signal value $p_s \in \mathbb{Q}$ can be calculated from the integer signal value $i_s \in \mathbb{Z}$ of the integer signal, using the rule $p_s = q_s \cdot i_s$, that signal rescalings $R(S_1, S_2) = R(q_{s1}, q_{s2}) = q_{s1}/q_{s2}$, with $R \in \mathbb{Q}^+$, on the target platform result in an expenditure of technical resources that is a direct function of the characteristics of the rational factor R, and that rescalings are to be carried out on the target platform without approximations of the factor R.

Forward transformations $VT_i$ are defined for a given target platform. For an input object $QSet_0$, each transformation $VT_i$ gives an associated output object $QSet_i$: $QSet_1 = VT_i(QSet_0)$. The output object $QSet_i$ includes all resolutions after transformation of the input resolutions using the rescaling strategy defined by $VT_i$. The strategy of a forward transformation $VT_i$ maps properties of the factor R, and thus creates defined resource requirements on the target platform.

| Rescaling | | Forward transformation $VT_i(QSet_0) \to QSet_i$ |
|---|---|---|
| ID | No rescaling | $VT_{ID}(QSet_0) := QSet_0$ |
| LS | Left shift in code | $VT_{LS}(QSet_0) := QSet_0 \cdot QSet(PSet_C(1), PSet_R(1, 2^{16}), Q_{Limits})$ |
| RS | Right shift in code | $VT_{RS}(QSet_0) := QSet_0 \cdot QSet(PSet_R(1), PSet_C(1, 2^{16}), Q_{Limits})$ |
| MUL | Multiplcation in code | $VT_{MUL}(QSet_0) := QSet_0 \cdot QSet(PSet_C(1), PSet_U(1), Q_{Limits})$ |
| DIV | Division in code | $VT_{DIV}(QSet_0) := QSet_0 \cdot QSet(PSet_U(1), PSet_C(1), Q_{Limits})$ |
| MUL_RS | Multiplication with subsequent right shift in code | $VT_{MUL\_RS}(QSet_0) := VT_{RS}(VT_{MUL}(QSet_0))$ |
| MUL_DV | Multiplication with subsequent division shift in code | $VT_{MUL\_DIV}(QSet_0) := VT_{DIV}(VT_{MUL}(QSet_0))$ |

As an example, shift operations with up to 16 bit positions are made possible. The enveloping interval $Q_{Limit}$ allows the size of the rescaling factor R to be limited. The transformation set $VT = \{VT_0, VT_1, \ldots, VT_n\}$ includes all allowed transformations (rescalings) for the integer scaling. An example of forward transformations of a QSet object with $VT = \{VT_{ID}, VT_{LS}, VT_{MUL}, VT_{DIV}\}$ is illustrated in FIG. 1.

A forward transformation, starting from an input resolution set, determines the target resolutions for a defined rescaling rule, for example a right shift, whereas the backward transformation $VT_i^{-1}$ determines the step that is the inverse thereof. For a resolution target set $QSet_0$, a determination is made as to which initial resolution set could have resulted in this target set, taking into account the associated forward transformation $VT_i$. For each forward transformation $VT_i$, a corresponding backward transformation $VT_i^{-1}$ must be defined.

The resolution set Q maps the combination of all resolutions, which is represented by a set of QSet objects:

$$Q(QSet_0, QSet_1, \ldots, QSet_n) := \bigcup_{i=0}^{n} QSet_i$$

A resolution set is completely defined by the set of its associated QSet objects.

The operations defined for QSet objects may be carried out on a resolution set Q by performing the particular operation element by element on the underlying QSet objects for Q. The resulting set of the result QSet objects forms a new resolution set Q.

For example, this means that an intersecting set formation of resolution sets $Q_{A \cap B} = Q_A \cap Q_B$ takes place via the intersection of all combinations of QSet objects composed of $Q_A$ with the QSet objects composed of $Q_B$.

In addition, a union set $Q_0 = Q_1 \cup Q_2$ is defined. The result set $Q_0$ in its abstract representation contains all QSet elements of the set $Q_1$ and all QSet elements of the set $Q_2$.

The explanation of definitions of sets and operations underlying the preferred embodiment is now followed by a description of the stated embodiment of the integer scaling method according to the invention, which carries out a calculation of signal resolutions for a given linking. Reference is made to an example of a linking which is not restricting or limiting, but, rather, is merely illustrative for better understanding.

Figure 2:
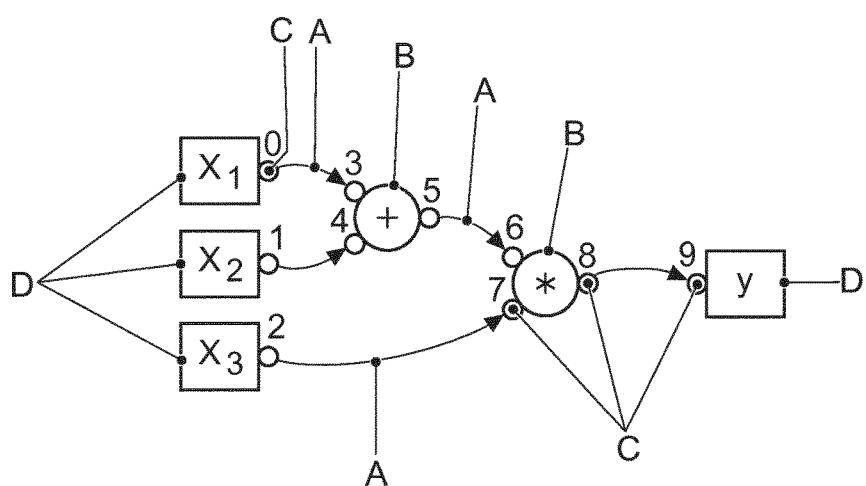
FIG. 2 shows an example of linking.

The components of linkings are explained with the aid of the linking by way of example with variables D shown in FIG. 2. Each operator has input-side and output-side pins. One resolution $q_i$ is associated with each pin $P_i$ of a scaled model. A rescaling takes place when the resolution $q_1$ at the start of an edge differs from the resolution $q_2$ at the end of an edge.

Secondary conditions of the fixed-point arithmetic which must be satisfied apply for the resolutions of an integer-scaled model, so that the scaled model calculates physically correct results. Several examples of secondary conditions are presented in the following table:

| Operator | Secondary conditions |
|---|---|
| Addition | All pins of the operator have the same resolution |
| Subtraction | All pins of the operator have the same resolution |
| Multiplication | The output-side resolution corresponds to the product of the input-side resolutions |
| Division | The output-side resolution corresponds to the numerator resolution divided by the denominator resolution |

The aim of the particularly preferred embodiment of the method for integer scaling is to determine a resolution at each pin of the linking. The following criteria are taken into account: At each pin, the resolution is neither above nor below the specified resolution limits. Resolution limits may be used to specify minimum accuracies and maximum bit widths that must be adhered to in order to avoid integer overflows. The secondary conditions of the fixed-point arithmetic are satisfied in order for the integer-scaled model to calculate physically correct result values. The number and characteristics of rescalings are optimized based on a cost function in order to minimize the resource requirements of the model on the target platform. The final determined resolution on a pin must be an element of an initial resolution set of this pin. Initial sets may be used to fix unchangeable model portions or to control the characteristics of solutions.

Figure 3:
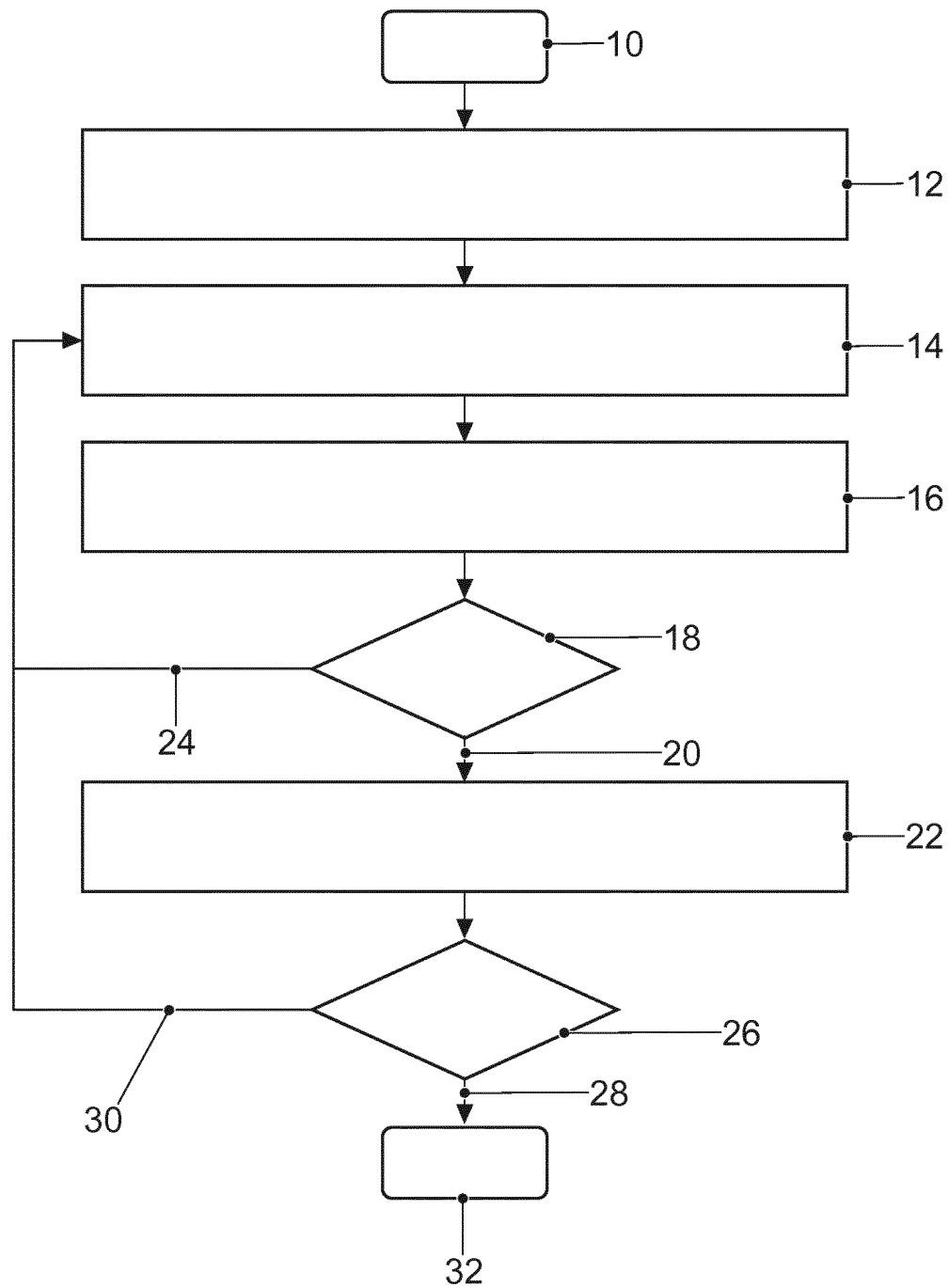
FIG. 3 shows a flow chart of one particularly advantageous embodiment of the method according to the invention.

In the particularly preferred embodiment of the method according to the invention for integer scaling described here, the above-defined set objects are used for efficiently depicting rescalings in representations, using finitely large and infinitely large resolution sets. FIG. 3 illustrates a flow chart of the stated embodiment.

After the start 10, during the initialization 12 an initial resolution set $Q_i$ ($QSet_0$, $QSet_1$, ..., $QSet_n$) is assigned to each pin $P_i$. The initial resolution set $Q_i$ fixes the solution space and the primary factor characteristic of a potential solution on the pin $P_i$. A pin whose resolution is to be unchangeable is initialized with a fixed resolution, i.e., with a QSet element comprising a $PSet_C$ numerator and a $PSet_C$ denominator. A pin whose resolution is allowed to be arbitrary is initialized with a QSet element comprising a $PSet_U$ (1) numerator and a $PSet_U$ (1) denominator. Other limiting initial sets are possible if necessary.

The resolution limits of the solution space are determined in advance by use of a suitable method, for example to ensure adherence to maximum signal bit widths or to achieve physical minimum accuracies of the integer scaling.

The specific linking shown in FIG. 2 is used as an illustrative example. The following exemplary secondary conditions are present in this example: The resolution of pin 1 is fixed at the value 2 and cannot be changed. The resolution of pin 9 is fixed at the value 1 and cannot be changed. The method is intended to calculate a resolution for pin 0 and pins 2-8. The solution for pin 0 should be a resolution for the prime factor base 2. Only rescalings of the "right shift" type are to be allowed.

The following QSet symbols are defined for a simplified representation:

$QSet_{0.5} := QSet(PSet_C(1^1), PSet_C(2^1))$ $QSet_1 := QSet(PSet_C(1^1), PSet_C(1^1))$ $QSet_2 := QSet(PSet_C(2^1), PSet_C(1^1))$ $QSet_{0.5 \cdot 2^{-x}} := QSet(PSet_C(1^1), PSet_R(2^1, 2^{15}))$ $QSet_{2^{-x}} := QSet(PSet_C(1^1), PSet_R(1^1, 2^{16}))$ $QSet_{2 \cdot 2^{\pm x}} := QSet(PSet_R(2^1, 2^{15}), PSet_C(1^1))$ $QSet_{2^{\pm x}} := QSet(PSet_R(1^1, 2^{16}), PSet_C(1^1, 2^{16}))$ $QSet_x := QSet(PSet_U(1^1), PSet_U(1^1))$ To simplify the representation, enveloping intervals are not considered: it is assumed that all resolutions are always to be limited to the enveloping interval $[2^{-16} \ldots 2^{+16}]$. In this example, the set of allowed forward transformations should be $VT := \{VT_{ID}, VT_{RS}\}$.

In the application of the particularly preferred embodiment of the method according to the invention to the specific linking in FIG. 2, in the initialization 12 phase an initial resolution set $Q_i$ is assigned to each pin $P_i$, based on the following secondary conditions:

| Pin # (i) | Initial resolution sets |
|---|---|
| 0 | $Q_i(QSet_{2^{\pm x}})$ |
| 1 | $Q_i(QSet_2)$ |
| 2-8 | $Q_i(QSet_x)$ |
| 9 | $Qi(QSet_1)$ |

In the forward propagation 14 phase, the resolution sets are propagated step by step along an edge A from the inputs to the outputs by forward transformations and set intersection operations. From the resolution set $Q_A$, at the start of an edge a result resolution set $Q_B'$ is calculated at the end of an edge, using forward transformation $VT = \{VT_0, \ldots, VT_n\}$. The resolution set $Q_B'$ is intersected with the existing resolution set based on initialization or a preceding calculation, giving the following:

$$Q_B := Q_B \cap Q_B' = Q_B \cap \left( \bigcup_{i=0}^{n} VT_i(Q_A) \right)$$

The forward propagation 14 at an operator calculates from its input resolution sets the output resolution set. The output resolution set is calculated on an operator-specific basis in order to satisfy secondary conditions of the fixed-point arithmetic. The resolution set calculated for the operator output is intersected by the existing resolution set $Q_i$ at this output pin $P_i$.

The terms $P_{A0}, \ldots, P_{Am}$ for the input pins of the operator and the term $P_B$ for the output pin of the operator result in the calculation rules provided in the following table:

| Operator | Calculation rule |
|---|---|
| Addition/subtraction/ operators with identical pin resolutions | $Q_B := Q_B \cap (\cap_{i=0}^{m} Q_{Ai})$| |
| Multiplication | $Q_B := Q_B \cap (\cap_{i=0}^{m} Q_{Ai})$| |
| Division | $Q_B := Q_B \cap (Q_{A0}/Q_{A1})$ with the numerator pin $P_{A0}$ and the denominator pin $P_{A1}$ |

For the linking shown by way of example in FIG. 2, a complete phase of the forward propagation 14 is carried out with the forward transformation set $VT = \{VT_{ID}, VT_{RS}\}$. The results of the individual calculation steps are provided in the following table:

| | Pin # | Propagation step | Result |
|---|---|---|---|
| 1. | 3 | Propagation, edge 0-3 | $Q_3 := Q_3 \cap (VT_{ID}(Q_0) \cup VT_{RS}(Q_0)) = Q(QSet_{2^{\pm x}})$| |
| 2. | 4 | Propagation, edge 1-4 | $Q_4 := Q_4 \cap (VT_{ID}(Q_1) \cup VT_{RS}(Q_1)) = Q(QSet_2, QSet_{2 \cdot 2^{\pm x}})$ |
| 3. | 5 | Propagation, addition operator | $Q_5 := Q_5 \cap Q_3 \cap Q_4 \cap Q_5 \cap Q(QSet_2, QSet_{2 \cdot 2^{\pm x}})$ |
| 4. | 6 | Propagation, edge 5-6 | $Q_6 := Q_6 \cap (VT_{ID}(Q_5) \cup VT_{RS}(Q_5)) = Q(QSet_2, QSet_{2 \cdot 2^{\pm x}})$ |
| 5. | 7 | Propagation, edge 2-7 | $Q_7 := Q_7 \cap (VT_{ID}(Q_2) \cup VT_{RS}(Q_2)) = Q(QSet_x)$ |
| 6. | 8 | Propagation, multiplication operator | $Q_8 := Q_8 \cap (Q_6 \cdot Q_7) = Q(QSet_x)$ |
| 7. | 9 | Propagation, edge 8-9 | $Q_9 := Q_9 \cap (VT_{ID}(Q_8) \cup VT_{RS}(Q_8)) = Q(QSet_1)$ |

If an empty resolution set ($Q_i=\{\ \}$) exists for a given pin $P_i$ of the linking, the embodiment of the method according to the invention immediately terminates, without a result.

The step of backward propagation 16 is carried out analogously to the forward propagation 14, in reverse order and with application of the inverse forward transformations $VT_i^{-1}$. Based on the resolution set $Q_B$ at the end of an edge, a resolution set $Q_A'$ at the start of an edge is calculated along an edge by means of inverse forward transformation $VT^{-1}=\{VT_0^{-1}, \ldots, VT_n^{-1}\}$. The resolution set $Q_A'$ is intersected by the existing resolution set $Q_A$.

$$Q_A := Q_A \cap Q_A' = Q_A \cap \left(\bigcup_{i=0}^{n} VT_i^{-1}(Q_B)\right)$$

A backward propagation is carried out for each input of the operator. The terms $P_{A0}, \ldots, P_{Am}$ for the input pins of the operator and the term $P_B$ for the output pin of the operator result in the calculation rules provided in the following table:

| Operator | Calculation rule for input $P_{Ai}$ |
|---|---|
| Addition/substraction/operators with identical pin resolutions | $Q_{Ai} := Q_{Ai} \cap Q_B$ |
| Multiplication | $Q_{Ai} := Q_{Ai} \cap (Q_B/\Pi_{0 \leq j \leq m\ \forall\ j \neq i} Q_{Aj})$ |
| Division | $Q_{A0} := Q_{A0} \cap (Q_{A1} \cdot Q_B)|$ with the numerator pin $P_{A0}$ |
| | $Q_{A1} := Q_{A1} \cap (Q_{A0}/Q_B)$ with the denominator pin $P_{A1}$ |

For the linking shown by way of example in FIG. 2, a complete phase of the backward propagation 16 is carried out as an example. The results of the individual calculation steps are provided in the following table:

| Pin # | Propagation step | Result |
|---|---|---|
| 1. 8 | Propagation, edge 8-9 | $Q_8 := Q_8 \cap (VT_{ID}^{-1}(Q_9) \cup VT_{RS}^{-1}(Q_9)) = Q(QSet_1, QSet_{2^{-x}})$ |
| 2. 7 | Propagation, multiplication operator | $Q_7 := Q_7 \cap (Q_8/Q_6) = Q(QSet_{0.5}, QSet_{0.5 \cdot 2^{-x}})$ |
| 3. 6 | Propagation, multiplication operator | $Q_6 := Q_6 \cap (Q_8/Q_7) = Q(QSet_{0.5}, QSet_{2 \cdot 2^{+x}})$ |
| 4. 5 | Propagation, edge 5-6 | $Q_5 := Q_5 \cap (VT_{ID}^{-1}(Q_6) \cup VT_{RS}^{-1}(Q_6)) = Q(QSet_2, QSet_{2 \cdot 2^{+x}})$ |
| 5. 4 | Propagation, addition operator | $Q_4 := Q_4 \cap Q_5 = Q(QSet_2, QSet_{2 \cdot 2^{+x}})$ |
| 6. 3 | Propagation, addition operator | $Q_3 := Q_3 \cap Q_5 = Q(QSet_2, QSet_{2 \cdot 2^{+x}})$ |
| 7. 2 | Propagation, edge 2-7 | $Q_2 := Q_2 \cap (VT_{ID}^{-1}(Q_7) \cup VT_{RS}^{-1}(Q_7)) = Q(QSet_{0.5}, QSet_{0.5 \cdot 2^{-x}})$ |
| 8. 1 | Propagation, edge 1-4 | $Q_1 := Q_1 \cap (VT_{ID}^{-1}(Q_4) \cup VT_{RS}^{-1}(Q_4)) = Q(QSet_2)|$ |
| 9. 0 | Propagation, edge 0-3 | $Q_0 := Q_0 \cap (VT_{ID}^{-1}(Q_3) \cup VT_{RS}^{-1}(Q_3)) = Q(QSet_2, QSet_{2 \cdot 2^{+x}})|$ |

Analogously to the forward propagation, the algorithm terminates without a solution if an empty resolution set ($Q_i=\{\ \}$) exists for a given pin $P_i$ of the model.

This is followed by a stability decision 18: a check is made as to whether the result is stable. The result is stable if, after a cycle comprising forward and backward propagation, the elements of the resolution sets do not differ from the immediately preceding cycle. If this is the case, the first "yes" decision 20 involves a step of solution selection 22. In this step, for an unsolved pin $P_i$ a final solution is determined in the linking. A pin $P_i$ is unsolved when its assigned resolution set $Q_i$ contains at least two resolutions. From the set of unsolved pins in the model, the pin $P_i$ to be solved must first be determined. The selection may be made arbitrarily or in favor of a deterministic integer scaling, using a suitable selection strategy, such as a cost analysis of the required transformations. If it is determined in the stability decision 18 that the result is not yet stable (first "no" decision 24), forward propagation 14 and backward propagation are carried out anew (iteration).

In the step of solution selection 22, for the selected pin $P_i$ a final resolution is determined from its resolution set $Q_i$. In the preferred embodiment according to FIG. 3, the specific procedure for selection of a resolution from $Q_i$ encompasses specifying the transformation costs $C_x$ for each transformation $VT_x$. The costs may be used to place the focus on run time efficiency (computer-intensive rescalings entail high costs) or memory efficiency (memory-intensive rescalings entail high costs). An iteration is made over all QSetobjects of the resolution set $Q_i$ ($QSet_0, \ldots, QSet_n$). The costs of all transformations in the model that are necessary at least for the existence of the QSet element under consideration are determined. The QSet object QSet* with the lowest costs is selected. A resolution $q* \in QSet*$ is selected from QSet* and converted into a new resolution set $Q_i$ whose single represented resolution is the selected resolution q*.

A consideration is subsequently made in a completeness decision 26 as to whether there are further unsolved pins. If further unsolved pins exist in the linking (second "no" decision 30), forward propagation 14 and backward propagation 16 must be carried out anew until stabilization is achieved, before the next pin can be reliably solved. In contrast, if all pins are solved (second "yes" decision 28), the integer scaling is completely terminated and the embodiment of the method reaches the end 32.

For an exemplary illustration with regard to the linking shown in FIG. 2, the unsolved pin $P_2$ is selected by way of example. The pin $P_2$ is unsolved, since the resolution set $Q_2$, due to two contained QSet objects, maps at least two specific resolutions. Cost values for the allowed transformations $VT:=\{VT_{ID}, VT_{RS}\}$ are defined as follows:

| Transformation | Costs $C_x$ |
|---|---|
| $VT_{ID}$ | 0 |
| $VT_{RS}$ | 1 |

The starting points are the results of the preceding phases of the propagation for the linking in FIG. 2:

| Pin # | Result, resolution set |
|-------|------------------------|
| 0 | $Q_0 = Q(QSet_2, QSet_{2 \cdot 2^x})$ |
| 1 | $Q_1 = Q(QSet_2)$ |
| 2 | $Q_2 = Q(QSet_{0.5}, QSet_{2 \cdot 2^{-x}})$ |
| 3 | $Q_3 = Q(QSet_2, QSet_{2 \cdot 2^x})$ |
| 4 | $Q_4 = Q(QSet_2, QSet_{2 \cdot 2^x})$ |
| 5 | $Q_5 = Q(QSet_2, QSet_{2 \cdot 2^x})$ |
| 6 | $Q_6 = Q(QSet_2, QSet_{2 \cdot 2^x})$ |
| 7 | $Q_7 = Q(QSet_1, QSet_{0.5 \cdot 2^{-x}})$ |
| 8 | $Q_0 = Q(QSet_1, QSet_{2^{-x}})$ |
| 9 | $Q_9 = Q(QSet_1)$ |

The costs of an object $QSet_j$ at a pin may be determined over the totality of transformations carried out in the linking that have resulted in the existence of this object $QSet_j$. The specific characteristic of such a cost calculation is not specified by the set algebra used by the scaling method described in the embodiment.

The following expression applies: $C_T(P_2, QSet_{0.5}) = 0$ Õ. The element $QSet_{0.5}$ requires only transformations of type $VT_{ID}$ for its existence at pin 2. The following expression applies: $C_T(P_2, QSet_{0.5*2^{-x}}) = 1$ Õ. The element $0.5 \cdot 2^{-x}$ requires at least one $VT_{ID}$ transformation in the linking for its existence at pin 2. The element $QSet_{0.5}$ is selected. Each represented resolution of this QSet element may be selected without adversely affecting the resources. Since the element already represents a specific resolution (q=0.5), no further selection is necessary. The result is $Q_2 := Q_2(QSet_{0.5})$. Since further unsolved pins exist in the linking shown in FIG. 2, a new propagation phase is started with the adapted resolution set $Q_2$.

LIST OF REFERENCE SYMBOLS

10 start
12 initialization
14 forward propagation
16 backward propagation
18 stability decision
20 first "yes" decision
22 solution selection
24 first "no" decision
26 completeness decision
28 second "yes" decision
30 second "no" decision
32 end
A edge
B operator
C pin
D variable

The invention claimed is:

1. A method for determining a value of an integer scaling in a linking of input sets to output sets, wherein the linking comprises operators, each of which has operator inputs and operator outputs that are at least partially linked to one another or to the input sets or to the output sets, wherein a computer device has a processing unit, a memory unit, and an output unit is used, and wherein a representation of the effect of each of the operators on a particular integer scaling of its operator inputs is provided for generating the particular integer scaling of its operator outputs, wherein the method comprises:

storing in the memory unit, for each input set, each operator input, each operator output, and each output set, an initial representation of a set of all allowed integer scalings and a representation of a rescaling of an integer scaling to a set of all integer scalings, wherein the initial representation of the set of all allowed integer scalings and the representation of the rescaling of the integer scaling to the set of all integer scalings are achievable by allowable transformations, propagating forward the initial representations of the input sets through the linking, so that, for each operator input, for each operator output, and for each output set, a representation of a set of all possible integer scalings is generated in the processing unit, wherein, according to one or more connections in the linking, and consistent with the initial representations for each translation of an input set to an operator input, the representation of the rescaling is applied, for each translation of an operator output to an operator input or to an output set, the representation of the rescaling is applied, and for each operator, the representation of its effect is applied, and specifying one element from one of the generated sets as the value of the integer scaling, based on a selection that is made in an automated manner in the processing unit, and outputting the specified value in the output unit.

2. The method for determining a value of an integer scaling in a linking of input sets to output sets according to claim 1, wherein the step of propagating forward comprises intersecting each representation obtained in one of the translations at an operator input with the representation at this operator input, intersecting each representation obtained by operator application at an operator output with the representation at this operator output, and intersecting each representation obtained for an output set with the representation of this output set.

3. The method for determining a value of an integer scaling in a linking of input sets to output sets according to claim 1 wherein the representations are based on prime factor sets having a finite number or an infinite number of prime factor combinations.

4. The method for determining a value of an integer scaling in a linking of input sets to output sets according to claim 3, wherein the representations are composed of union sets of sets of quotients from elements of prime factor sets.

5. The method for determining a value of an integer scaling in a linking of input sets to output sets according to claim 1, further comprising:

after the forward propagation and prior to the determination of an element, propagating the generated representations of the output sets backward through the linking, so that for each operator input, for each operator output, and for each input set, a representation of the set of all possible integer scalings is generated in the processing unit, wherein according to the one or more connections in the linking, and consistent with the representations obtained in the forward propagation, for each translation of an output set to an operator output, the representation of the inverse rescaling is applied, and for each translation of an operator input to an operator output or to an input set, the representation of the inverse rescaling is applied, and for each operator, the representation of its inverse effect is applied.

6. The method for determining a value of an integer scaling in a linking of input sets to output sets according to claim 5, further comprising:

comparing the representations generated by forward propagation to the representations generated by backward propagation, and further forward propagating if a backward propagation most recently took place, or a further backward propagating if a forward propagation most recently took place, until the representations generated by the most recent forward propagation no longer differ from the representations generated by the most recent backward propagation.

7. The method for determining a value of an integer scaling in a linking of input sets to output sets according to claim 1, further comprising:
   after the one element is specified from one of the generated sets, projecting the generated representation of the set onto the representation of the element,
   based on the other generated representations and the representation of the element, carrying out at least one new propagation, and
   fixing a further element from one of the other sets that is generated after this new propagation as the value of the integer scaling at another location in the linking, based on a selection that is made in an automated manner in the processing unit, and
   outputting the fixed further value in the output unit.

8. The method for determining a value of an integer scaling in a linking of input sets to output sets according to claim 1, wherein the selection that is made in an automated manner in the processing unit comprises:
   assessing the elements of the generated set of the integer scalings with a cost function, and
   determining the element to be selected based on its associated costs.

9. The method for determining a value of an integer scaling in a linking of input sets to output sets according to claim 1, further comprising:
   selecting allowable transformations from a set of possible transformations before the representation of the rescaling of an integer scaling is created or selected for the set of all integer scalings, and
   storing the selected allowable transformations in the memory.

10. A non-transitory computer readable medium comprising a computer program product that may be loaded directly into the internal memory of a computer, comprising:
    software code sections with which a method according to claim 1 is carried out when the computer program product runs on the computer.

* * * * *